United States Patent
Atungsiri et al.

(10) Patent No.: US 11,483,065 B2
(45) Date of Patent: Oct. 25, 2022

(54) WIRELESS COMMUNICATIONS APPARATUS AND METHODS

(71) Applicant: Sony Corporation, Tokyo (JP)

(72) Inventors: Samuel Asangbeng Atungsiri, Basingstoke (GB); Yuxin Wei, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/047,402

(22) PCT Filed: Apr. 12, 2019

(86) PCT No.: PCT/EP2019/059553
§ 371 (c)(1),
(2) Date: Oct. 14, 2020

(87) PCT Pub. No.: WO2019/201810
PCT Pub. Date: Oct. 24, 2019

(65) Prior Publication Data
US 2021/0119698 A1    Apr. 22, 2021

(30) Foreign Application Priority Data

Apr. 16, 2018  (EP) .................................... 18167616
May 11, 2018  (EP) .................................... 18171954

(51) Int. Cl.
*H04W 16/24*       (2009.01)
*H04B 7/204*       (2006.01)
*H04B 7/185*       (2006.01)

(52) U.S. Cl.
CPC ....... *H04B 7/2041* (2013.01); *H04B 7/18502* (2013.01); *H04B 7/18541* (2013.01)

(58) Field of Classification Search
None
See application file for complete search history.

(56) References Cited

U.S. PATENT DOCUMENTS 6,246,874 B1    6/2001 Voce
2017/0230104 A1 8/2017 Purkayastha et al.

FOREIGN PATENT DOCUMENTS

| EP | 0421698 A2 | 4/1991 |
| WO | 2014/124753 A1 | 8/2014 |
| WO | 2016/179037 A1 | 11/2016 |

OTHER PUBLICATIONS

International Search Report and Written Opinion dated Jun. 26, 2019 for PCT/EP2019/059553 filed on Apr. 12, 2019, 11 pages.

(Continued)

*Primary Examiner* — Willie J Daniel, Jr.
(74) *Attorney, Agent, or Firm* — Xsensus LLP

(57) ABSTRACT

A method of operating a first non-terrestrial network part supporting a plurality of spot beams providing corresponding coverage areas in a wireless telecommunications network, the method comprising: communicating with a communications device in a first coverage area associated with a first spot beam of the first non-terrestrial network part: identifying a new coverage area for the communications device, the new coverage area corresponding to a coverage area of a second spot beam different from the first spot beam, and implementing a mobility procedure for the communications device; wherein, if the second spot beam is supported by the first non-terrestrial network part, the mobility procedure is a first mobility procedure and if the second spot beam is supported by a second non-terrestrial network part different from the first non-terrestrial network part the mobility procedure is a second mobility procedure different from the first mobility procedure.

5 Claims, 8 Drawing Sheets

(56) References Cited

OTHER PUBLICATIONS

3GPP, "Study on New Radio (NR) to support non terrestrial networks", Release 15, 3GPP TR 38.811, V0.3.0, Dec. 2017, pp. 1-56.
Holma et al., "LTE for UMTS OFDMA and SC-FDMA based radio access", John Wiley and Sons, 2009, 11 pages.
3GPP, "NR; NR and NG-RAN Overall Description; Stage 2", 3GPP TS 38.300, V.15.0.0, Release 15, Dec. 2017, pp. 1-68.

WIRELESS COMMUNICATIONS APPARATUS AND METHODS

CROSS-REFERENCE TO RELATED APPLICATIONS

The present application is based on PCT filing PCT/EP2019/059553, filed Apr. 12, 2019, which claims priority to EP 18167616.4, filed Apr. 16, 2018, and EP 18171954.3, filed May 11, 2018, the entire contents of each are incorporated herein by reference.

BACKGROUND

Field

The present disclosure relates to wireless communications apparatus and methods for the cell change of a communications device in a cell of a wireless communications network provided by a non-terrestrial network part.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the third generation partnership project (3GPP) defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless telecommunications systems that need to be addressed.

SUMMARY

The present disclosure can help address or mitigate at least some of the issues discussed above.

According to the present technique there is provided a method for an infrastructure equipment of a wireless telecommunications network, the wireless telecommunications network comprising a base station and a non-terrestrial network part, the non-terrestrial network part transmitting one or more beams to provide a wireless access interface for transmitting signals to and receiving signals representing data from a communications device within a coverage region of a cell or a spot beam. The method comprises determining a location of the communications device, determining the coverage region of the cell or the spot beam, determining a relative motion, relative to the communications device, of the coverage region of the cell or the spot beam, and based on the location and the relative motion, initiating a cell change of the communications device.

Embodiments of the present technique can provide an arrangement which improves a continuity of service for a communications device which is in a cell provided by a non-terrestrial part, even if one or both of the communications device and the coverage region of the cell may be moving with respect to the surface of the Earth.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
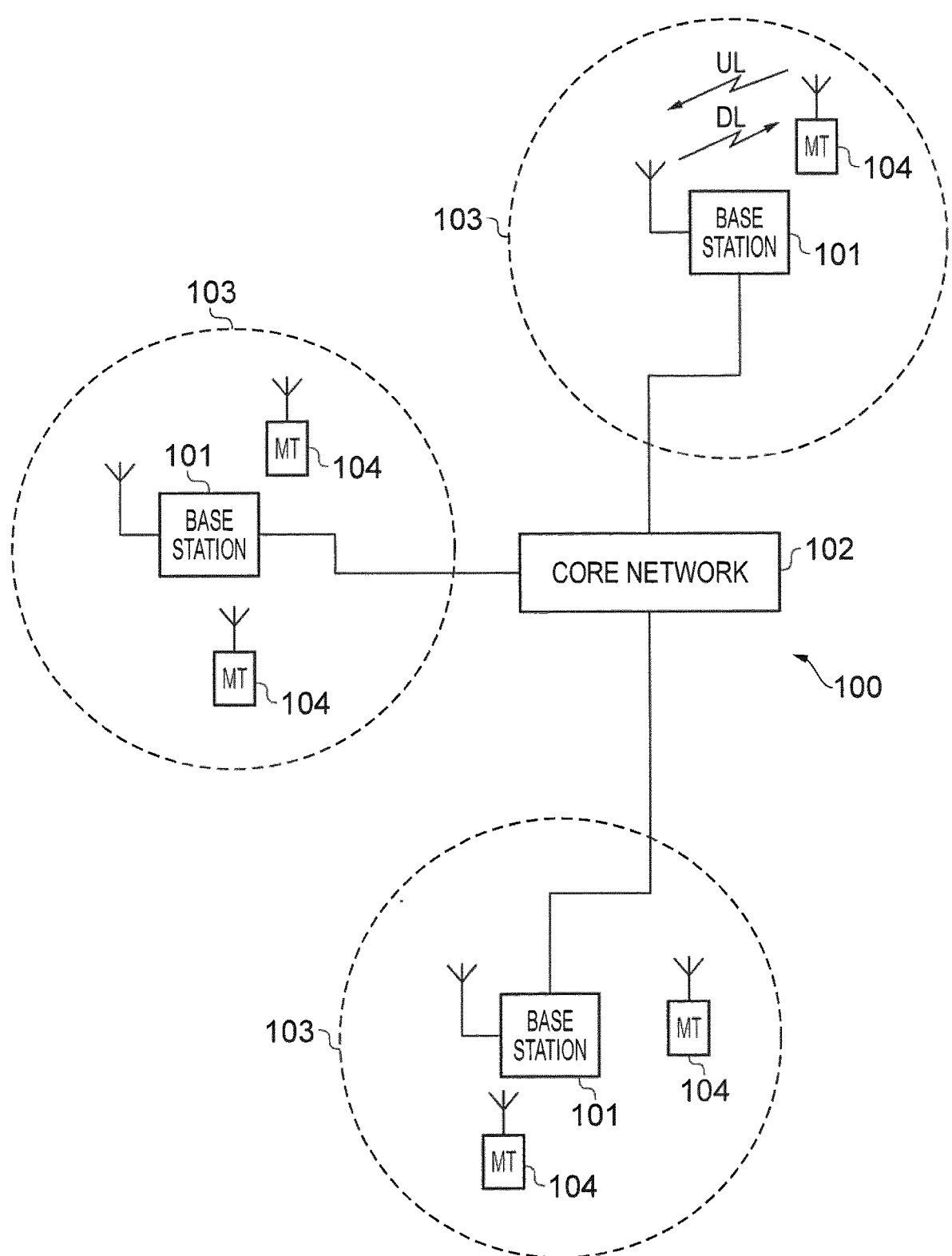
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from terminal devices 104. Data is transmitted from the base stations 101 to the terminal devices 104 within their respective coverage areas 103 via a radio downlink. Data is transmitted from the terminal devices 104 to the base stations 101 via a radio uplink. The core network part 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
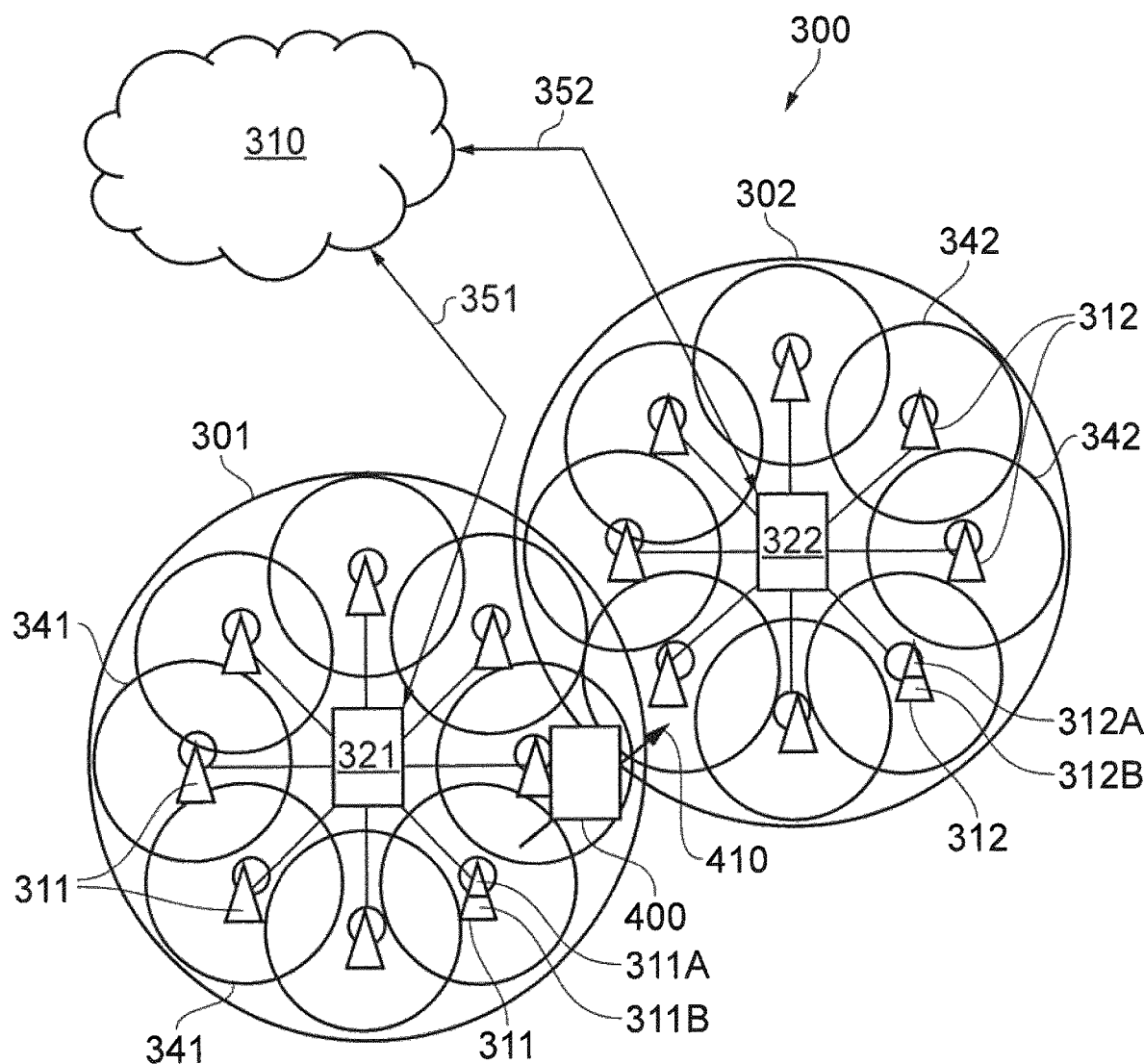
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

In wireless telecommunications networks, such as LTE type or 5G type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to the RRC connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in the RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving.

A wireless telecommunications network, such as a 5G (NR) network may support an RRC Inactive (RRC_INACTIVE) mode, in which, as in the RRC idle mode, it may not transmit data, but must transition to the RRC connected mode in order to transmit or receive data. In both the RRC Inactive and RRC Idle modes, mobility (i.e. change of serving cell) is by means of UE-based cell reselection in accordance with parameters transmitted by the wireless telecommunications network. In the RRC Connected mode, mobility may be network-controlled; that is, a handover may be initiated by an infrastructure equipment of the network. The handover may be conventionally initiated in response to, for example, measurement reports transmitted by the terminal device, which may indicate the result of measurements of downlink signals transmitted by the network in both the serving cell and one or more neighbour (candidate) cells.

Figure 3:
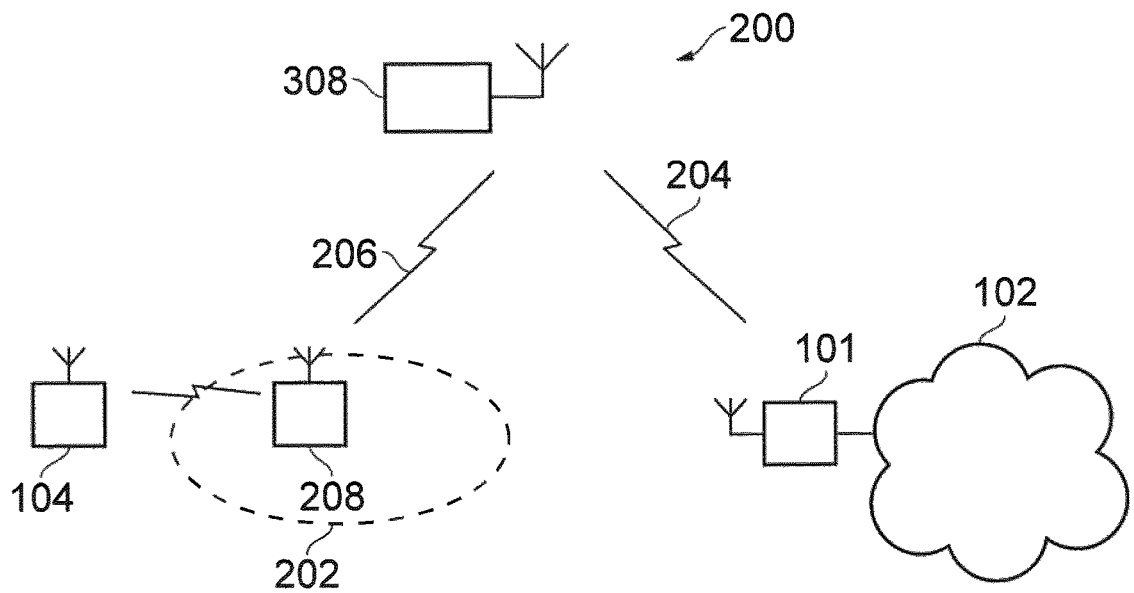
FIG. 3 schematically represents some example aspects of a wireless telecommunication system in accordance with embodiments of the present disclosure.

FIG. 3 schematically shows a wireless telecommunications system 200 according to an example embodiment of the present disclosure. The wireless telecommunications system 200 in this example is based broadly around an LTE-type or 5G-type architecture. Many aspects of the operation of the wireless telecommunications system/network 200 are known and understood and are not described here in detail in the interest of brevity. Operational aspects of the wireless telecommunications system 200 which are not specifically described herein may be implemented in accordance with any known techniques, for example according to the current LTE-standards or the proposed 5G standards.

The wireless telecommunications system 200 comprises a core network part 102 (which may be a 5G core network or a NG core network) coupled to a radio network part. The radio network part comprises a base station (g-node B) 101 coupled to a non-terrestrial network part 308. The non-terrestrial network part 308 may be an example of infrastructure equipment.

The non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308.

The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary orbit such that the non-terrestrial network part 308 does not move with respect to a fixed point on the Earth's surface. The geo-stationary orbit may be a circular orbit approximately 36,000 km above the Earth's equator. Alternatively, the satellite may be in an non-geostationary orbit, so that the non-terrestrial network part 308 moves with respect to a fixed point on the Earth's surface.

The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 3, the base station 101 is shown as ground-based, and coupled to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204.

In some embodiments, the wireless communications links 204, 206 operate at a same frequency; in some embodiments, the wireless communications links 204, 206 operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206.

Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

In some embodiments, the non-terrestrial network part 308 may be configured to perform some of the functionality conventionally carried out by the base station 101. In particular, latency-sensitive functionality (such as acknowledging a receipt of the uplink data, or responding to a RACH request) may be performed by the non-terrestrial network part 308 instead of by the base station 101.

In some embodiments, the base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such embodiments, a wireless communications link between the base station 101 and a ground station (not shown) may provide connectivity between the base station 101 and the core network part 102.

The communications device 208 shown in FIG. 3 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay, may thus provide connectivity to the core network part 102 for terminal devices which are within a transmission range of the communications device 208.

It will be apparent that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

There is a need to ensure that connectivity for the communications device 208 with the base station 101 can be maintained, in light of the movement of the communications device 208, the movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station.

However, the inventors of the present technique have appreciated that such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the earth.

Similarly, it may be expected that the communications device 208 may be mounted on an airborne vehicle itself, having a ground speed of several hundreds of kilometres per hour.

These disadvantages may be overcome by embodiments of the present technique, according to which an infrastructure equipment of the wireless telecommunications network determines a coverage region of a cell of the network, the cell being generated from one or more beams transmitted from the non-terrestrial network part. Based on a relative motion of a communications device in RRC connected mode, relative to the coverage region of the cell, the infrastructure equipment determines whether to initiate a handover of the communications device.

Figure 4:
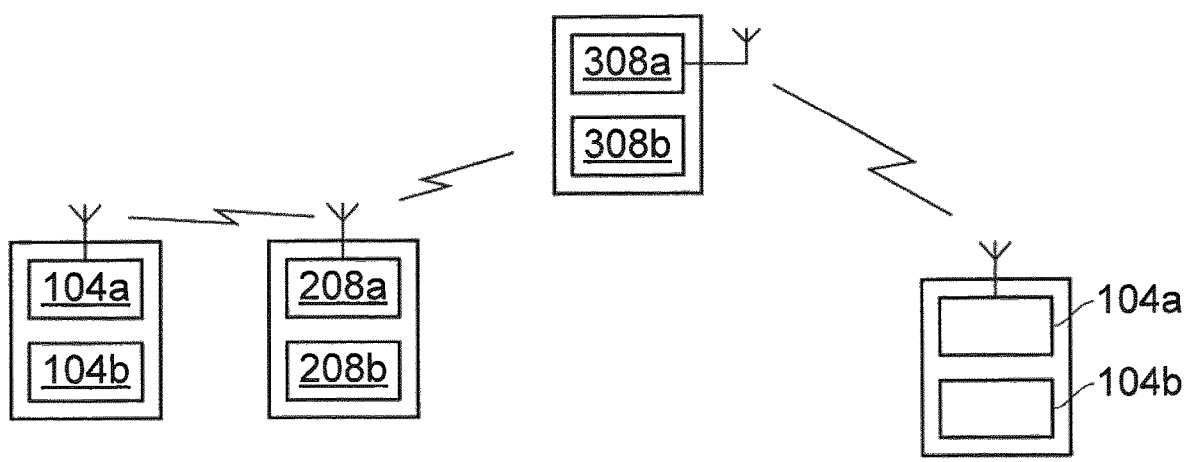
FIG. 4 schematically represents further example aspects of a wireless telecommunication system in accordance with embodiments of the present disclosure.

FIG. 4 schematically represents further aspects of a wireless telecommunication system in accordance with example embodiments of the present disclosure.

The base station 101 comprises transceiver circuitry 101a (which may also be referred to as a transceiver/transceiver unit) for transmission and reception of wireless signals and processor circuitry 101b (which may also be referred to as a processor/processor unit) configured to control the base station 101 to operate in accordance with embodiments of the present disclosure as described herein. The processor circuitry 101b may comprise various sub-units/sub-circuits for providing desired functionality as explained further herein. These sub-units may be implemented as discrete hardware elements or as appropriately configured functions of the processor circuitry. Thus the processor circuitry 101b may comprise circuitry which is suitably configured/programmed to provide the desired functionality described herein using conventional programming/configuration techniques for equipment in wireless telecommunications systems. The transceiver circuitry 101a and the processor circuitry 101b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 101 will in general comprise various other elements associated with its operating functionality.

The non-terrestrial network part 308 comprises transceiver circuitry 308a (which may also be referred to as a transceiver/transceiver unit) for transmission and reception of wireless signals and processor circuitry 308b (which may also be referred to as a processor/processor unit) configured to control the non-terrestrial network part 308. The processor circuitry 308b may comprise various sub-units/sub-circuits for providing functionality as explained further herein. These sub-units may be implemented as discrete hardware elements or as appropriately configured functions of the processor circuitry. Thus the processor circuitry 308b may comprise circuitry which is suitably configured/programmed to provide the desired functionality using conventional programming/configuration techniques for equipment in wireless telecommunications systems. The transceiver circuitry 308a and the processor circuitry 308b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the non-terrestrial network part 308 will in general comprise various other elements associated with its operating functionality.

The communications device 208 comprises transceiver circuitry 208a (which may also be referred to as a transceiver/transceiver unit) for transmission and reception of wireless signals. The communications device 208 is configured to provide connectivity via the non-terrestrial network part 308. For example, the transceiver circuitry 208b may be adapted in accordance with the nature of the communications channel to the non-terrestrial network part 308, which may be characterized by a high path loss and an absence of multipath.

The communications device 208 further comprises processor circuitry 208b (which may also be referred to as a processor/processor unit) configured to control the communications device 208. The processor circuitry 208b may comprise various sub-units/sub-circuits for providing functionality as explained further herein. These sub-units may be implemented as discrete hardware elements or as appropriately configured functions of the processor circuitry. Thus the processor circuitry 208b may comprise circuitry which is suitably configured/programmed to provide the desired functionality using conventional programming/configuration techniques for equipment in wireless telecommunications systems. The transceiver circuitry 208a and the processor circuitry 208b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the communications device 208 will in general comprise various other elements associated with its operating functionality.

The terminal device 104 comprises transceiver circuitry 104a (which may also be referred to as a transceiver/transceiver unit) for transmission and reception of wireless signals. The terminal device 104 further comprises processor circuitry 104b (which may also be referred to as a processor/processor unit) configured to control the terminal device 104. The processor circuitry 104b may comprise various sub-units/sub-circuits for providing functionality as explained further herein. These sub-units may be implemented as discrete hardware elements or as appropriately configured functions of the processor circuitry. Thus the processor circuitry 104b may comprise circuitry which is suitably configured/programmed to provide the desired functionality using conventional programming/configuration techniques for equipment in wireless telecommunications systems. The transceiver circuitry 104a and the processor circuitry 104b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the terminal device 104 will in general comprise various other elements associated with its operating functionality.

It will be appreciated that in practice the radio network part may comprise a plurality of base stations and non-terrestrial network parts serving a larger number of communications devices and terminal devices across various communication cells. However, only a single base station, single non-terrestrial network part, single communications device single terminal device are shown in FIG. 3 and FIG. 4 in the interests of simplicity.

As with a conventional mobile radio network, the terminal device 104 is arranged to communicate data to and from the base station (transceiver station) 101. The base station 101 is in turn communicatively connected to a serving gateway, S-GW, (not shown) in the core network part 102 which is arranged to perform routing and management of mobile communications services to the terminal devices in the wireless telecommunications system 200 via the base station 101. In order to maintain mobility management and connectivity, the core network part 102 also includes a mobility management entity (not shown) which manages the enhanced packet service (EPS) connections with the terminal device 104 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 102 to an external packet data network, for example the Internet. As noted above, the operation of the various elements of the wireless telecommunications system 200 shown in FIG. 3 may be broadly conventional apart from where modified to provide functionality in accordance with embodiments of the present disclosure as discussed herein.

Figure 5:
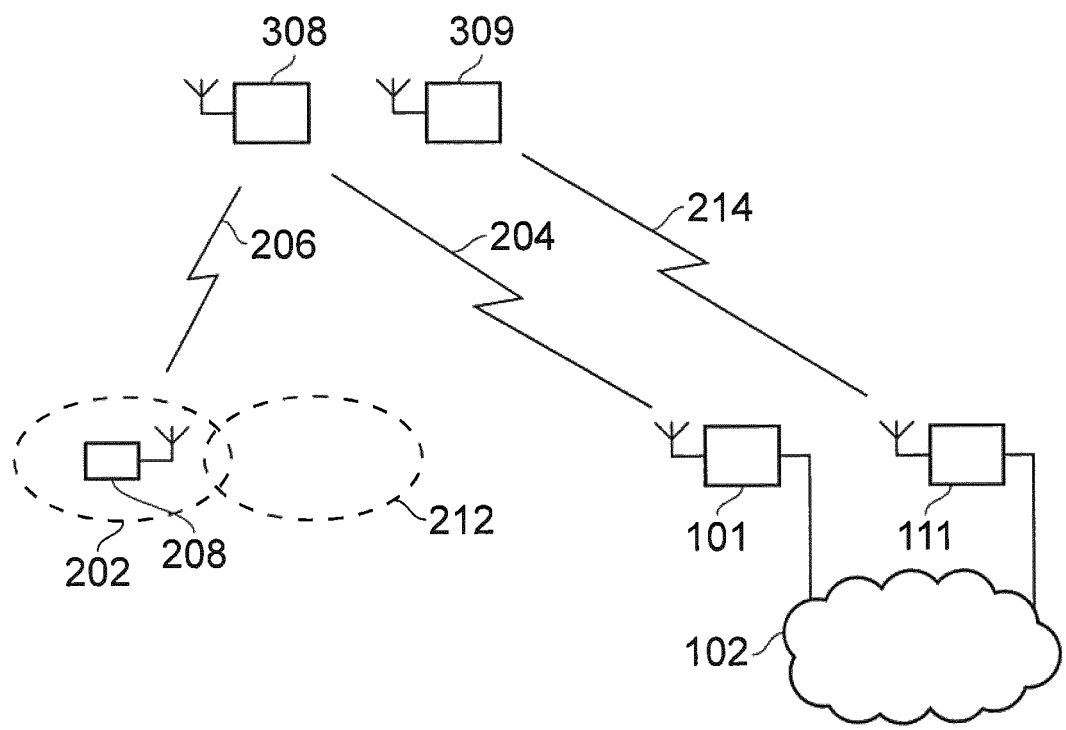
FIG. 5 schematically represents further example aspects of a wireless telecommunication system in accordance with embodiments of the present disclosure.

FIG. 5 schematically represents further aspects of a wireless telecommunication system in accordance with example embodiments of the present disclosure.

FIG. 5 shows the communications device 208, the non-terrestrial network part 308, the base station 101 and the cell 202 as described above in respect of FIG. 3. The terminal device 104 is omitted for clarity.

In addition, FIG. 5 shows a second non-terrestrial network part 309, coupled to a second base station 111 by means of a wireless communications link 214. The second non-terrestrial network part 309 and the second base station 111 may be substantially the same as the first non-terrestrial network part 308 and the first base station 101.

A second cell 212 is shown, corresponding to a coverage region provided by the second non-terrestrial network part 309.

Figure 6:
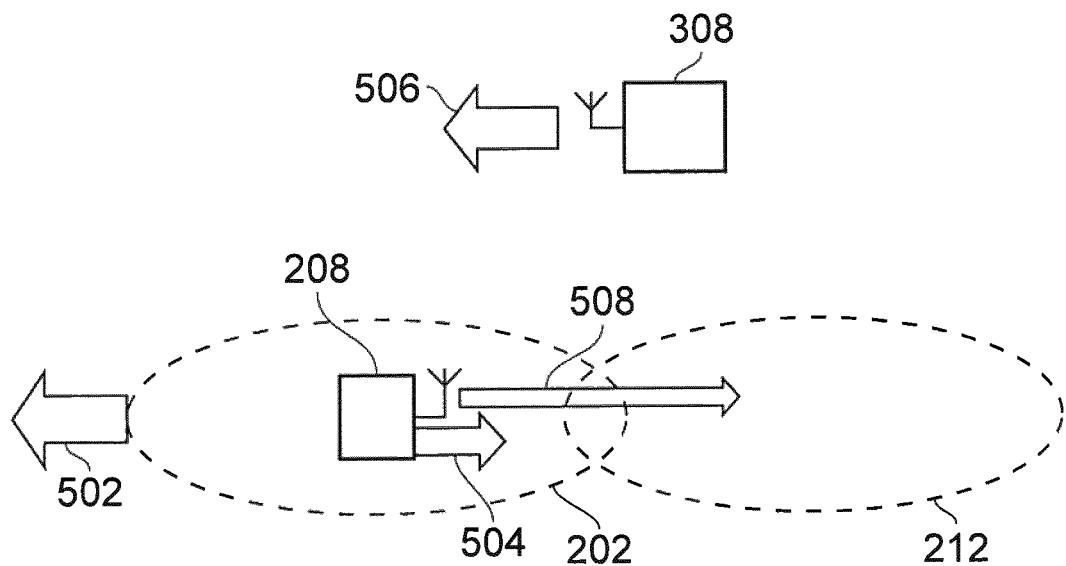
FIG. 6 illustrates a motion of a communications device, a non-terrestrial network part and a cell, in accordance with embodiments of the present disclosure.

FIG. 6 illustrates a motion of the first non-terrestrial network part 308 (indicated by the arrow 506), resulting in a corresponding motion of the first cell 202, indicated by the arrow 502. At the same time, the communications device 504 may be moving, as indicated by the arrow 504. The arrows 502, 504, 506 represent movement relative to the surface of the Earth; for example, by reference to latitude and longitude. As described above, in some embodiments, the first non-terrestrial network part 308 may have a substantially geo-stationary orbit, such that there is no motion of the first non-terrestrial network part 308 or the cell 202 relative to the Earth's surface. In some embodiments, the first non-terrestrial network part 308 may be configured such that there is substantially no movement of the cell 202 relative to the Earth's surface, even though the first non-terrestrial network part 308 may move, for example around a nominal position, relative to the Earth's surface.

The communications device 504 may be stationary (with respect to the Earth's surface) or moving.

As a result of the movement of one or both of the cell 202 and the communications device 504, there may arise movement of the communications device 504 relative to the cell 202.

Figure 7:
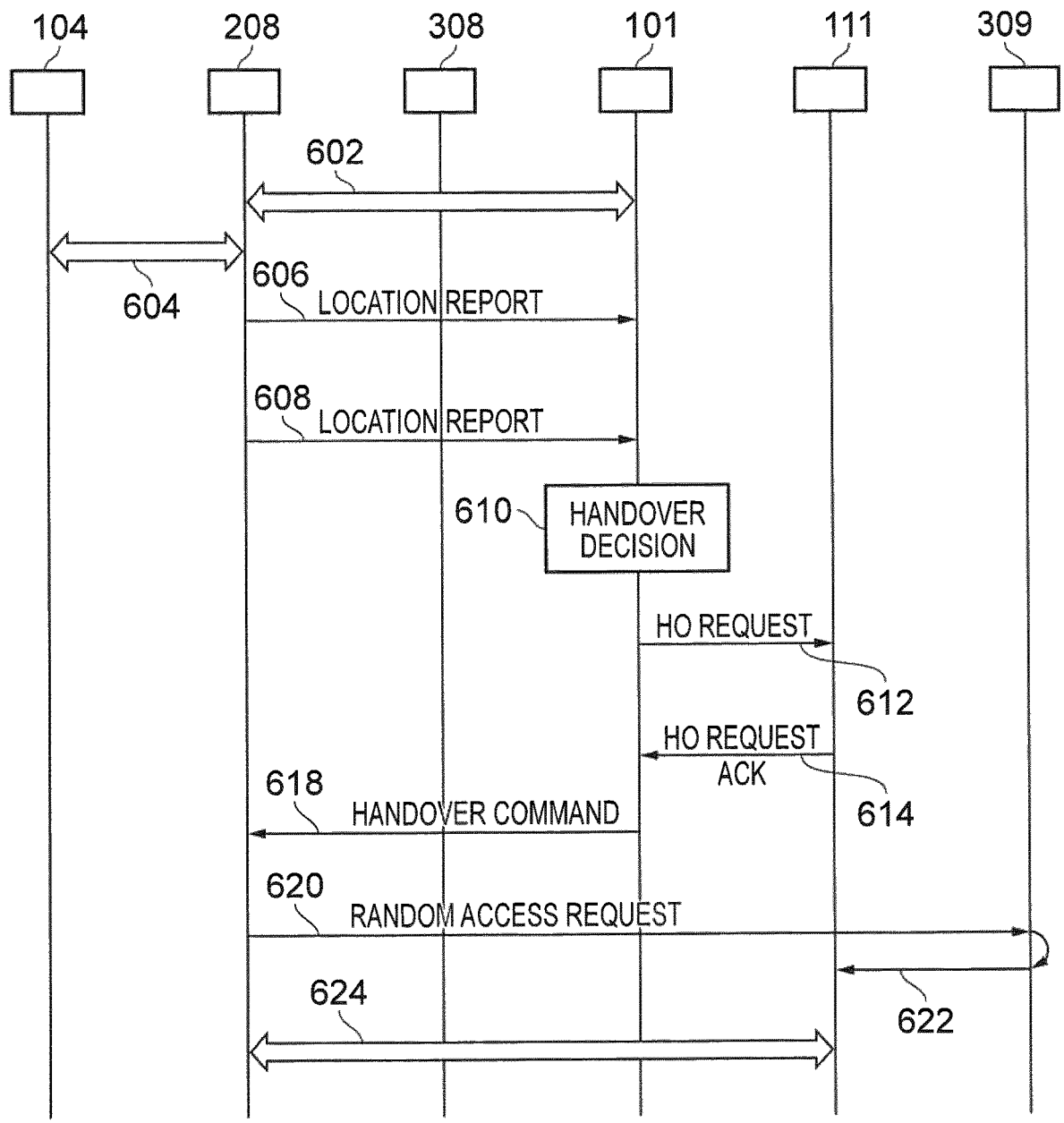
FIG. 7 is a message sequence chart representing example aspects of a handover procedure in accordance with embodiments of the present disclosure.

FIG. 7 illustrates a message sequence chart illustrating an example embodiment of the present technique in the context of the example architecture illustrated in FIG. 5 and described above.

The procedure starts at step 602 with the establishment of an RRC connection 602 between the communications device 208 and the base station 101 in the cell 202 generated by the first non-terrestrial network part 308.

The establishment of the RRC connection 602 may be broadly by means of conventional techniques, that is to say, by means of a sequence of transmissions starting with a random access request transmitted by the communications device 208 followed by a contention resolution and an allocation of resources by the base station 101 to the communications device 208. As a result of establishing the RRC connection 602, the communications device 208 enters into the RRC connected mode.

When the RRC connection 602 is established, signals representing uplink data transmitted by the communication device 208 are received by the first non-terrestrial network part 308 and signals representing uplink data are forwarded to the base station 101; similarly, signals representing downlink data transmitted from the base station 101 and signals representing the downlink data are transmitted to the communications device 208 by the first non-terrestrial network part 308.

It is thus able to obtain connectivity with the core network part 102, which is not shown in FIG. 7 for conciseness.

In FIG. 7, the communications device 208 is shown as providing relay capabilities; that is, it generates a wireless access interface by which terminal devices such as the terminal device 104 can obtain connectivity, via the communications device 208 acting as a relay device and the base station 101, with the core network part 102. In step 604, the terminal device 104 establishes a connection with the communications device 208. Depending on the implementation of the communications device 208, the wireless access interface which it generates for the purposes of providing service and connectivity to terminal devices may comply substantially with the standards for a wireless access interface generated by a base station such as the base station 101 in accordance with standards, such as the LTE standard or a 5G standard. In such cases the connection 604 may correspond to a conventional RRC connection, and the establishment of the connection 604 may be substantially conventional, that is to say by means of transmissions such as a random access request and an RRC connection setup complete message and so on.

By means of the connection 604 between the terminal device 104 and the communications device 208, and the RRC connection 602, the terminal device 104 is thus able to obtain connectivity via the communications device 208 and the base station 101 with the core network part 102.

FIG. 7 shows a single terminal device 104, however, in some embodiments of the present technique the communications device 208 may provide relay functionality for a plurality of terminal devices.

As illustrated in FIG. 6 and described above, the communications device 208 is, having established the connection 602, served in the cell 202 generated by the one or more beams transmitted by the first non-terrestrial network part 308. In accordance with embodiments of the present technique, the communications device 208 reports its location to the base station 101 by means of a first location report 606 and a second location report 608. The transmission of the first location report 606 and second location report 608 may be in response to predetermined conditions being met. For example, the location reports 606, 608 may be transmitted periodically according to a predetermined schedule, or may be triggered based on a determination by the communications device 208 that it has moved by a distance which exceeds a predetermined distance threshold since a previous location report was transmitted.

Parameters by which the predetermined schedule may be determined by the terminal device 104 may be indicated in broadcast system information (such as a system information block, SIB, 3 or SIB 4), or may be indicated by means of dedicated (i.e. point-to-point) signalling from the first base station 101 or the first non-terrestrial network part 308 to the terminal device 104. In some embodiments, the schedule is adjusted based on the relative motion of the terminal device 104 and the cell 202.

The location reports 606, 608 may indicate the location of the communications device 208 with respect to a co-ordinate system based on the surface of the Earth; for example by means of latitude and longitude co-ordinates. The communications device 208 may determine its location by means of conventional techniques, such as for example by means of a global navigation satellite system (GNSS)-based location system, such as the Global Positioning System (GPS). A GNSS receiver coupled to or integrated within the communications device 208 may provide the location of the communications device 208. Since the communications device 208 has connectivity with the wireless telecommunications system 200, GNSS assistance information (such as ephemeris data for GNSS satellites) may be received via the base station 101 and the communications device 208 may determine its location based on the received assistance data.

If the communications device 208 is stationary, that is to say does not move with respect of the surface of the Earth, the location of the communications device 208 may be preconfigured in the communications device 208.

Although two location reports 606, 608 are shown in FIG. 7, the present technique is not so limited. For example, where the communications device 208 is substantially stationary with respect to the surface of the Earth (e.g. it moves only within a region having an area much smaller than the area of the cell 202), only one location report may be transmitted while the communications device 208 is in the RRC connected mode.

The location reports 606, 608 may include an indication of the direction and speed of the communications device 208.

In some embodiments, the location, direction and speed may be reported with respect to a two-dimensional or planar frame of reference, such as based on a coordinate system covering the surface of the earth (e.g., latitude and longitude). In some embodiments, one or more of the location, direction and speed may be reported in three dimensions, such as by means of the inclusion of an altitude (or rate of change of altitude) with respect to the surface of the earth.

Based on the receipt of the first location report 606 and the second location report 608, the base station 101 determines that a handover is appropriate at step 610. Further details of the handover decision 610 are described below. As part of the handover decision 610, the base station 101 determines a target cell (such as the cell 212 illustrated in FIG. 5 and FIG. 6, controlled by the second base station 111 and generated by the one or more beams transmitted by the second non-terrestrial network part 309).

In response to determining that the handover should occur to the target cell 212, the base station 101 transmits a handover request message 612 to the second base station 111. The handover request message 612 indicates a request for the allocation of resources for the purposes of providing connectivity to the communications device 208. The handover request message 612 may further provide information (such as number, identity, quality of service requirements, bandwidth usage) regarding connections between the communications device 208 and any terminal devices for which the communications device 208 is providing relay functionality, such as the connection 604 between the communications device 208 and the terminal device 104.

The handover request message 612 may include an identifier of the communications device 208 (such as a cell radio network temporary identifier (C-RNTI) or other identifier allocated by the base station 101 or by an entity within the core network part 102). The handover request message 612 may include an identifier of the target base station 111.

Based on the receipt of the handover request message 612, the second base station 111 may perform an admission control process (not illustrated), by which it determines whether or not it has sufficient capacity (such as bandwidth capacity) to accept the handover request. If the second base station 111 determines that it is able to accept the handover request, then it transmits a handover request acknowledgement message 614 to the first base station 101. The handover request acknowledgement message 614 may comprise an indication of resources which are to be used by the communications device 208 in establishing a connection between the communications device 208 and the second base station 111. This indication of resources may be in the form of a transparent container (i.e. for onward transmission to the communications device 208, without intermediate processing, by the first base station 101), comprising a handover command message 618 which is to be transmitted from the first base station 101 to the communications device 208.

In any case, the first base station 101 transmits to the communications device 208 the handover command message 618, which identifies the second cell 212 to which the communication device 208 should perform a handover.

The handover command message 618 may further comprise one or more of a new identifier (such as a new C-RNTI) to be used by the communications device 208 and a RACH preamble to be used for a first transmission in the target cell 212.

The handover command message 618 may further comprise an indication of the communications resources to be used by the communications device 208 and (where applicable) the terminal device 104. The indication of communications resources may indicate separate communications resources for each of the communications device 208 and each terminal device (such as the terminal device 104) for which the communications device 208 is acting as a relay. Alternatively, the indication of communications resources may indicate aggregate communications resources to be apportioned to the communications device 208 and the terminal device 104 by the communications device 208.

The handover command message 618 may further comprise system information indicating parameters applicable to the target cell 212, so that the communications device 208 is not required to acquire any broadcast system information messages in the new cell 212 prior to transmitting or receiving data in the new cell.

In response to receiving the handover command message 618, the communications device 208 initiates an establishment of an RRC connection 624 in the second cell 212 with the second base station 111 via the second non-terrestrial network part 309. This may be by means of a transmission of a random access request message 620 which is received by the second non-terrestrial network part 309 and forwarded at step 622 to the second base station 111.

The first base station 101 may forward any buffered downlink data which has not been successfully transmitted to the communications device 208 to the second base station 111 (not shown in FIG. 7).

The establishment of the RRC connection 624 between the communications device 208 and the second base station 111 may then follow a conventional approach for the establishment of a connection in a new cell as part of a handover procedure.

One or both of the first base station 101 and the second base station 111 may transmit an indication (not shown in FIG. 7) to the core network part 102 to ensure that subsequent downlink data for the communications device 208 and any terminal device (such as the terminal device 104) for which the communications device 208 is acting as a relay is transmitted to the second base station 111.

As a result of the handover procedure illustrated in FIG. 7 and described above, the communications device 208 thus has established the RRC connection 624 with the second base station 111 via the second non-terrestrial network part 309. As a result, the communications device 208 is able to maintain the connection 604 with the terminal device 104 and thus to provide ongoing and/or substantially uninterrupted connectivity for the terminal device 104 with the core network part 102.

The first base station 101 may determine that the handover procedure has been completed (e.g. as a result of receiving an indication from the second base station 111) and in response may release any communications resources and identifiers which it had reserved for the use of the communications device 208 in the first cell 202.

Figure 8:
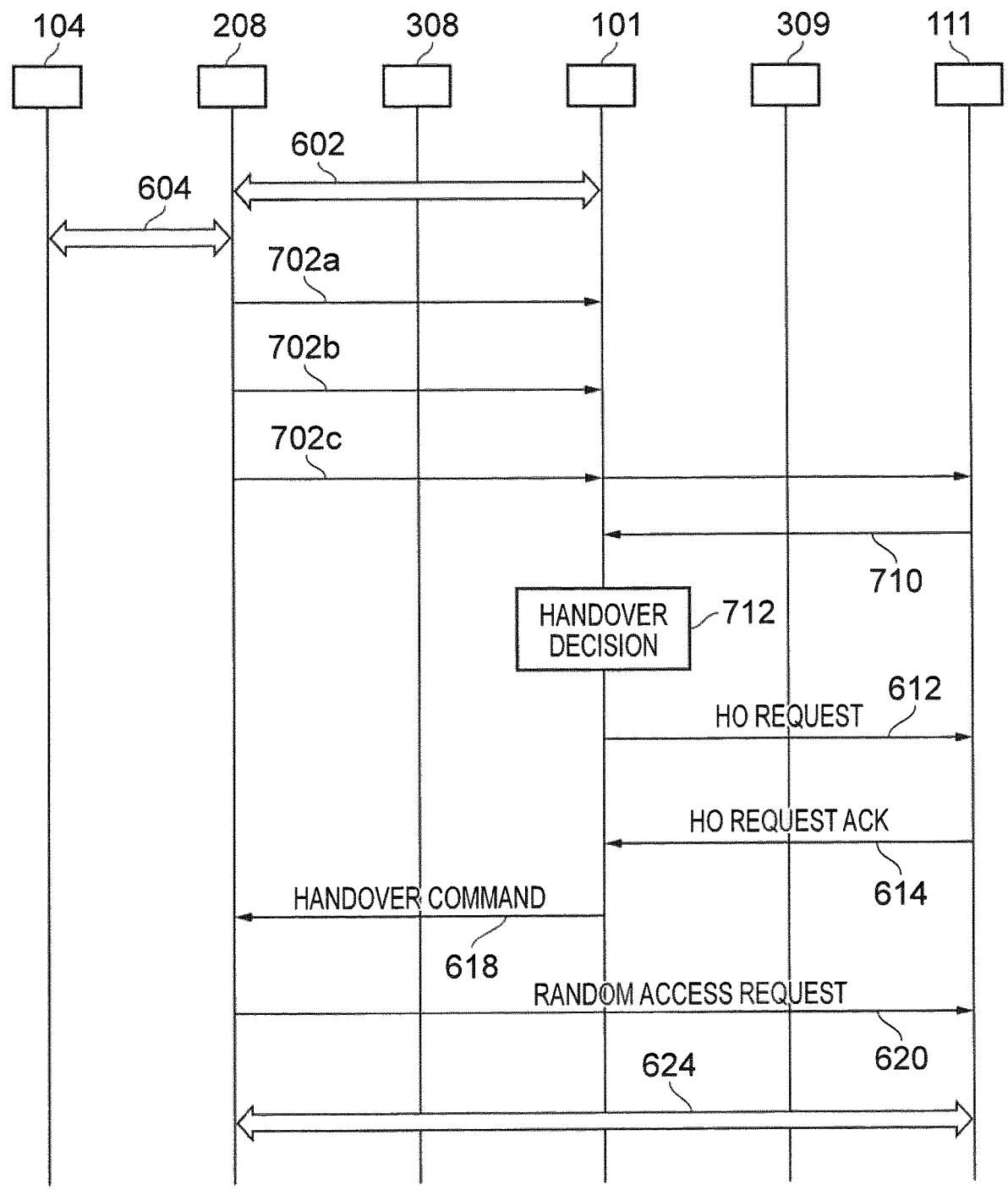
FIG. 8 is a message sequence chart representing example aspects of a handover procedure in accordance with further embodiments of the present disclosure.

FIG. 8 illustrates a message sequence chart in accordance with example embodiments of the present technique. Aspects of the example illustrated in FIG. 8 may be substantially similar to those described above and illustrated in FIG. 7. As such, these elements are not described here for conciseness. For example, the RRC connection 602 between the communications device 208 and the first base station 101, and the RRC connection 604 between the terminal device 104 and the communications device 208 have been already described.

According to the example technique illustrated in FIG. 8, the communications device 208 transmits uplink reference signals 702a, 702b, 702c which are received by the first base station 101, having been forwarded from the first non-terrestrial network part 308.

Based on the receipt of the uplink reference signals 702a-c the base station 101 determines that the communications device 208 is still located within the coverage of the cell 202 generated by the one or more beams transmitted by the first non-terrestrial network part 308.

In step 702c, as a result of the relative motion of the communications device 208 and the cell 202 generated by the first non-terrestrial network part 308, the uplink reference signal 702c transmitted by the communications device 208 is received not only by the first non-terrestrial network part 308 and forwarded to the first base station 101 but additionally received by the second non-terrestrial network part 309 and is thus forwarded to the second base station 111.

The information content of the uplink reference signals 702a-c may be limited so that they are identifiable to the first base station as having been transmitted by the communications device 208. In addition, the uplink reference signals 702a-c may indicate one or more of an identity of the base station 101, an identity of the cell 202 and an identity of the first non-terrestrial network part 308, so as to distinguish the uplink reference signals 702a-c transmitted by the communications device 208 from other reference signals transmitted by another communications device (which may have moved into the coverage of the cell 202).

Similarly, the uplink reference signals 702a-c may contain sufficient identification information so that the second base station 111 is able to determine one or more of the following:

that the uplink reference signals 702a-c were transmitted by the communications device 208;

that the uplink reference signals 702a-c were transmitted by a communications device currently located in the cell 202;

that the uplink reference signals 702a-c were transmitted by a communications device currently connected to the first base station 101;

that the uplink reference signals 702a-c were transmitted by a communications device currently in a cell generated by one or more beams transmitted by the first non-terrestrial network part 308.

Although the uplink reference signals 702a-c are shown in FIG. 8 as being received by the base station 101, in some embodiments of the present technique, the uplink reference signals 702a-c are received by the first non-terrestrial network part 308 and are not forwarded to the base station 101. In some such embodiments, the first non-terrestrial network part 308 may transmit indications to the base station 101, indicating, respectively, that the uplink reference signals 702a-c have been received.

On receipt of the uplink reference signal 702c, the second base station 111 transmits an indication of receipt of uplink reference signals 710 to the first base station 101. The indication of receipt of uplink reference signals 710 may indicate that the first base station 101 has received the uplink reference signal 702c. The indication of receipt of uplink reference signals 710 transmitted by the second base station 711 may indicate one or more of the identity of the cell 212 in which the uplink reference signal 702c was received and an identity of the communications device 208.

In response to receiving the indication of receipt of uplink reference signals 710, the first base station 101 may make a handover decision 712 which will be described in further details below. In response to making the decision to handover 712, the first base station 101 may proceed, as described above in respect of FIG. 7, with the transmission of the handover request message 612 and the procedure may thus follow the subsequent steps as described above in respect of FIG. 7.

In some embodiments, one or more aspects of the handover decision 712 is carried out at the first non-terrestrial network part 308. For example, the first non-terrestrial network part 308 may receive the uplink reference signals 702a-c and the second non-terrestrial network part 309 may receive the uplink reference signal 702c (without forwarding it to the second base station 111). The second non-terrestrial network part 309 may transmit the indication of receipt of uplink reference signals 710, directly (for example by means of a direct communications link between the first and second non-terrestrial network parts 308, 309) or indirectly via the second and first base stations 111, 101, to the first non-terrestrial network part 308, in response to receiving the uplink reference signal 702c.

In some embodiments of the present technique, an indication of uplink reference signal parameters used to generate the uplink reference signals 702a-c, which may comprise one or more of a preamble, a scrambling code, a code sequence, and one or more communications resources, may be transmitted by the base station 101 or the first non-terrestrial network part 308 to the second base station 111 or the second non-terrestrial network part 309, together with one or more of the identity of the cell 202, an identity of the first base station 111 and an identity of the communications device 208. Based on the reception of the uplink reference signal 702*c*, the indication of the uplink reference signal parameters used to generate the uplink reference signals 702*a-c* and the received identity information, the second base station 111 or the second non-terrestrial network part 309 may determine the appropriate destination for the indication of receipt of uplink reference signals 710.

In some embodiments, the uplink reference signal parameters are assigned by one of the first base station 101 and the first non-terrestrial network part 308.

In some embodiments, the uplink reference signal associated with one or more of the uplink reference signals 702*a-c* are assigned by one of the second base station 111 and the second non-terrestrial network part 309. An indication of the uplink reference signal parameters assigned by the one of the second base station 111 and the second non-terrestrial network part 309 may be transmitted to one of the first base station 101 and the first non-terrestrial network part 308.

Figure 9:
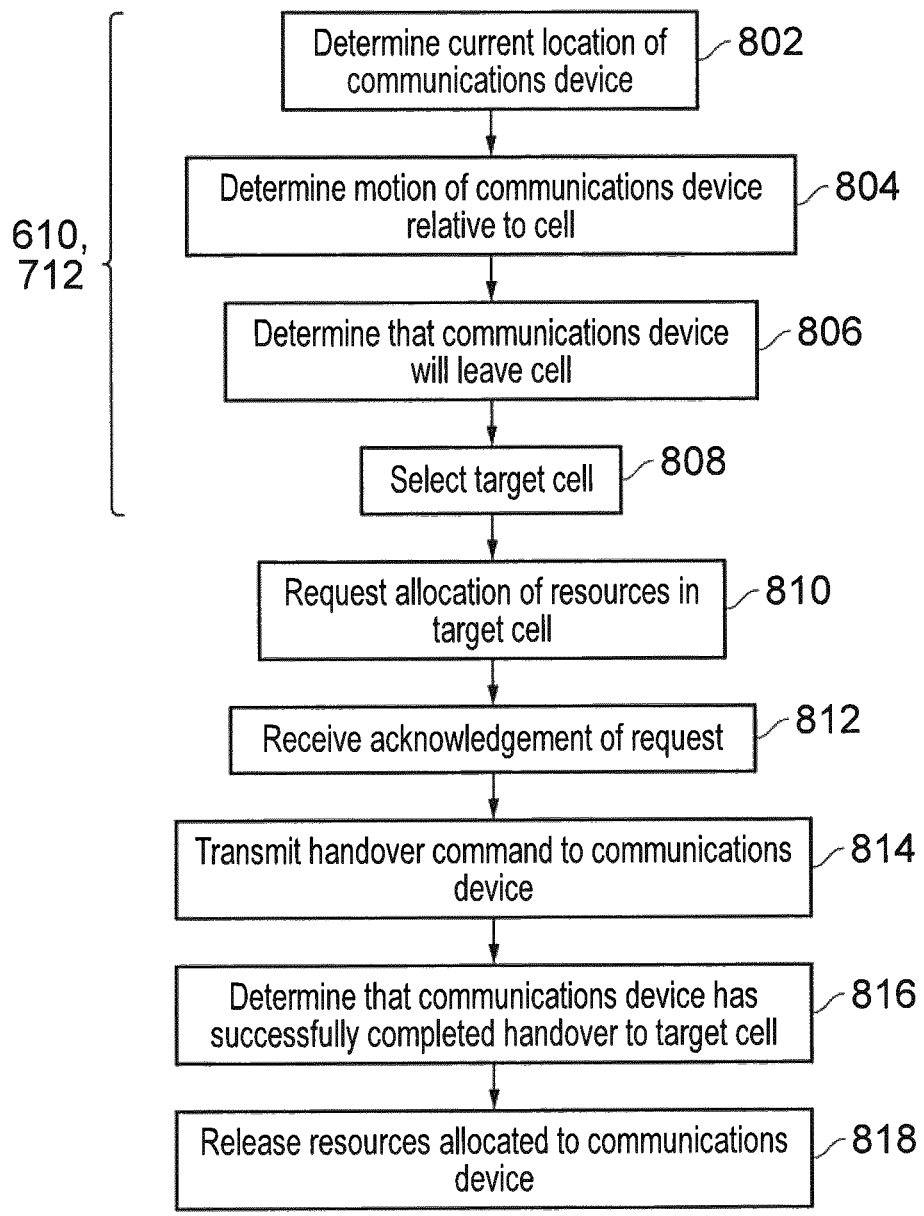
FIG. 9 is a process flow diagram corresponding to a process by which an infrastructure network of a wireless telecommunications system may implement example embodiments of the present technique.

FIG. 9 illustrates a process by which an infrastructure network of a wireless telecommunications system may implement example embodiments of the present technique. The process of FIG. 9 may be carried out by, for example, the first non-terrestrial network part 308 or by the first base station 101. In some embodiments, the process of FIG. 9 may be carried out by two or more entities within the wireless telecommunications system 200; for example, some steps in FIG. 9 may be carried out by the first non-terrestrial network part 308 and other steps may be carried out by the first base station 101. In some embodiments, some or all of the process in FIG. 9 may be carried out by infrastructure equipment other than the first non-terrestrial network part 308 and the first base station 101, but which is operatively coupled to one or both of the first non-terrestrial network part 308 and the first base station 101.

The steps 802, 804, 806 and 808 may collectively form part of the handover decision 610 described above in respect of FIG. 7 or the handover decision 712 described above in respect of FIG. 8.

The process of FIG. 9 starts at step 802, in which the infrastructure equipment determines a current location of the communications device 208. The determination of the current location may be based on, for example, location reports such as the first location report 606 and the second location report 608 of FIG. 7. Alternatively, the current location may be determined based on the receipt of one or more uplink reference signals such as one or more of the uplink reference signal 702*a-c*.

Subsequently at step 804 the infrastructure equipment determines a motion of the communications device 208 relative to the serving cell 202. For example, the motion of the communications device 208 relative to the cell may be determined by first determining a motion of the communications device 208 relative to the surface of the Earth, by means of a plurality of location reports, such as the first location report 606 and the second location report 608.

The relative motion may be further determined based on a known trajectory of the first non-terrestrial network part 308, which may be based on a known orbit of a satellite vehicle on which the first non-terrestrial network part 308 is mounted, or based on a known trajectory of an airborne vehicle on which the first non-terrestrial network part 308 is mounted.

In some embodiments of the present technique, the first non-terrestrial network part 308 is mounted on an airborne vehicle or satellite which is geostationary, that is such that the coverage region of the cell 202 is substantially unchanged over a period of time with respect to the surface of the Earth.

For example, as shown in FIG. 6 above, the first non-terrestrial network part 308 is moving according to the direction of the arrow 506 resulting in a movement relative to the surface of the Earth of the coverage area of the cell 202, as indicated by the arrow 502. At the same time the communications device 208 is moving in a direction indicated by the arrow 504. The motion 504 of the communications device 208 may be determined by comparing the locations of the communications device 208 as indicated in the first and second location reports 606, 608 and determining a time period between times at which the first and second location reports 606, 608 correspond. As a result of both the movement relative to the surface of the Earth of the coverage area of the cell 202 and the movement of the communications device 208, the infrastructure equipment determines that communications device 208 will move, relative to the cell 202 in the direction indicated by the arrow 508.

Based on the determined motion 508 of the communications device 208 relative to the cell 202 and the current location of the communications device 208, then at step 806 it is determined that the communications device 208 will follow a path, relative to the cell 202, so that the communications device 208 will leave the coverage area 202 of the cell and thus that a handover should be triggered.

At step 808 the infrastructure equipment selects a target cell. This may be based on knowledge of the coverage area of the target cell (which itself may be moving relative to the surface of the Earth), combined with the determined relative motion of the communications device 208. For example, based on a determination of the coverage region of the cell 212, and the determined relative motion 508 of the communications device 208 with respect to the cell 202, the infrastructure equipment determines that the communications device 208 is moving into the coverage of the cell 212 and therefore that the target cell is the cell 212.

In some embodiments, the coverage region of the cells 202, 212 (and their respective movement, if any) and the location and movement of the communications device 208 are considered to be constrained to the surface of the earth, and thus may be represented by a 2-dimensional orthogonal coordinate system (for example, longitude and latitude).

In some embodiments, the coverage region of the cells 202, 212 (and their respective movement, if any) and the location and movement of the communications device 208 are not considered to be constrained to the surface of the earth, and may be represented by a 3-dimensional orthogonal coordinate system; for example, longitude, latitude and altitude with respect to the Earth's surface. In particular, the coverage region of the cells 202, 212 may extend above the surface of the earth so that where the communications device 208 is airborne, it may obtain connectivity via, for example, the first non-terrestrial network part 308.

Movement may be represented by a vector in the appropriate coordinate system. For example, where a movement (for example, the movement 504 of the communications device 208) is determined by means of periodic location reports, such as the location reports 606, 608, the movement may be represented by a vector from the first location to the second location, scaled according to a time period corresponding to an interval between the times at which the two location reports were generated. Relative motion may be determined by means of vector subtraction.

In some embodiments of the present technique, the determination of the current location, absolute motion (i.e. relative to the surface of the Earth) and relative motion (relative to the coverage area of the cell 202) of the communications device 208 may be determined quantitatively. For example, the absolute motion of the communications device 208 may be determined to be a speed, measured in kilometres per hour, in a certain direction (for example, expressed in terms of a heading angle with respect to north).

In some embodiments, one or more of the current location, absolute motion and relative motion of the communications device 208 may be determined qualitatively.

For example according to the process illustrated in FIG. 8, then in the handover decision 712 the step 802 of determining the current location of the communications device 208 may comprise determining that the communications device 208 is within the coverage region of the cell 202 and not within the coverage region of any neighbouring cell, such as the cell 212.

Similarly, determining, at step 804, the motion of the communications device 208 relative to the current cell 202 may comprise determining that the communications device 208, having previously not being located within the coverage region of the cell 212, is now within both the coverage region of the cell 202 and the target cell 212. The infrastructure equipment may thus determine that, relative to the cell 202, the communications device 208 has moved in a direction towards the target cell 212.

Based on the determination in step 804 that, relative to the cell 202, the communications device 208 has moved in a direction towards the target cell 212, the infrastructure equipment may determine both that the communications device 208 is following a trajectory such that it will leave the coverage of the cell 202 (step 806) and the identity of the target cell 212 (step 808).

In response to determining that the communications device 208 is to be handed over and the determination of the target cell 212, the infrastructure equipment initiates a request for the allocation of resources in the target cell at step 810; this may be by means of the transmission of a handover request 612 as described above.

In step 812, the infrastructure equipment receives an acknowledgement of the request. This may comprise the handover request acknowledgement message 614. As described above the acknowledgement of the request may include an indication of the communications resources to be used by the communications device 208 in establishing the RRC connection 624 in the new cell 212 with the new base station 111.

In step 814 the infrastructure equipment transmits a handover command to the communications device; this may comprise the transmission of the handover command 618 to the communications device 208. The handover command 618 may include an identity of the new cell 212, an indication of the resources to be used in establishing the connection 624 in the new cell.

In some embodiments of the present technique the outcome of the handover decision 712, 610 may be that a handover should be completed as soon as is feasible, and no additional delay is introduced into the handover preparation or execution.

In some embodiments, the outcome of the handover decision 712, 610 may be that a handover should be carried out at some (determined) point in the future. For example, the infrastructure equipment may determine that, based on the relative motion of the communications device 208 with respect to the cell 202, the communications device 208 will remain within the coverage region of the cell 202 for another 15 seconds, after which it should perform a handover to the target cell 212.

Accordingly, the handover command 618 may indicate that the handover is a conditional handover. That is to say that the handover should take place only when certain conditions are satisfied. For example, the conditions may comprise a time period, such that the handover is to take place at the expiry of the indicated time period, or the conditions may comprise a future time so that the handover is to take place at the indicated future time.

At step 816 the infrastructure equipment determines that the communications device 208 has successfully completed the handover to the target cell 212. This may be by means of the receipt of an indication from the second base station 111 that the new connection 624 has been successfully established, or may be in response to determining that no transmission has been made by the communications device 208 in the current cell 202 for a predetermined duration.

In response to determining that the communications device has successfully completed the handover, at step 818 the infrastructure equipment releases resources allocated to the communications device.

In FIG. 7 and FIG. 8, the communications device 208 is shown as being in the RRC connected mode prior to the handover decision 610, 712. However, in some embodiments of the present technique, the communications device 208 is in an idle mode (such as the RRC idle mode) and does not have an ongoing RRC connection established with the base station 101 throughout the process illustrated in FIG. 7 and FIG. 8.

Conventionally, a handover may refer to a network-controlled cell change of a communications device in the RRC connected mode. However, it will be appreciated that the a network-controlled cell change may be carried out in accordance with embodiments of the present technique, in respect of a communications device which is not in the RRC connected mode, and/or where the cell change is not preceded by a conventional handover preparation phase, in which resources are reserved in a target cell.

In some embodiments, the terminal device 104 may periodically (e.g. in accordance with parameters transmitted by the first base station 101 or the first non-terrestrial network part 308) enter the RRC connected mode from one of the RRC Idle state and the RRC Inactive state and transmit a location report (such as one of the first and second location reports 606, 608). The terminal device 104 may, having transmitted one of the location reports, return to one of the RRC Idle state and the RRC Inactive state.

Accordingly, in some embodiments, the handover decision 610, 712 may in comprise a cell change decision, made when the communications device 208 is in one of the RRC Idle state and the RRC Inactive state, that the communications device 208 should change its serving cell, for example by means of a network-initiated cell reselection procedure. In response to the cell change decision that the terminal device 104 should change cell, the first base station 101 or the first non-terrestrial network part 308 may page the terminal device 104 and transmit (with the page, or subsequently) an indication to the terminal device 104 that it should change cell. The indication may identify the new cell 212 to which the terminal device should reselect.

According to some embodiments of the present technique, the process of FIG. 8 may be modified, so that for example one or more steps may be omitted, or steps may be performed in a different sequence.

For example, where the process is carried out as part of a cell change procedure, steps 810 and 812 may be omitted, and steps 802, 804, 806 and 808 may form a cell change decision. Additionally or alternatively, step 814 may comprise transmitting an indication of a cell change to the terminal device 208.

Thus there has been described a method for an infrastructure equipment of a wireless telecommunications network, the wireless telecommunications network comprising a base station and a non-terrestrial network part, the non-terrestrial network part transmitting one or more beams to provide a wireless access interface for transmitting signals to and receiving signals representing data from a communications device within a coverage region of a cell or a spot beam. The method comprises determining a location of the communications device, determining the coverage region of the cell or the spot beam, determining a relative motion, relative to the communications device, of the coverage region of the cell or the spot beam, and based on the location and the relative motion, initiating a cell change of the communications device.

Figure 10:
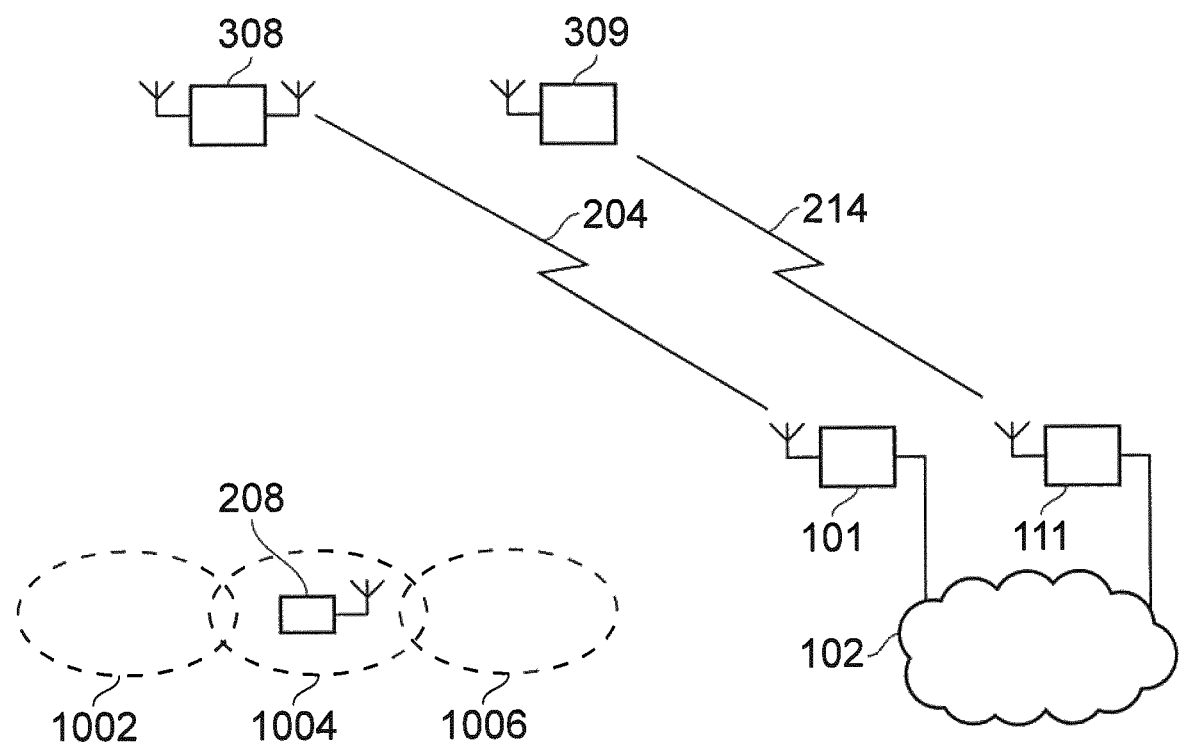
FIG. 10 schematically represents further example aspects of a wireless telecommunication system in accordance with embodiments of the present disclosure.

FIG. 10 schematically represents further aspects of a wireless telecommunication system in accordance with example embodiments of the present disclosure. FIG. 10 shows the communications device 208, the non-terrestrial network part 308, the base station 101, the second non-terrestrial network part 309, the second base station 111, the wireless communications links 204, 214 and the second cell 212 as described above in respect of FIG. 5.

FIG. 10 also shows a first coverage region 1002 (which may correspond to the cell 202 of FIG. 5) corresponding to a coverage region of a first spot beam generated by the non-terrestrial network part 308, a second coverage region 1004, corresponding to a coverage region of a second spot beam generated by the non-terrestrial network part 308, and a third coverage region 1006, corresponding to a coverage region of a third spot beam generated by the second non-terrestrial network part 309 (which may correspond to the second cell 212 of FIG. 5). A coverage region may also be referred to as a coverage area.

Mobility between coverage regions corresponding to spot beams which are generated by the same non-terrestrial network part may be referred to herein as intra-NTN part mobility, while mobility between coverage regions corresponding to spot beams which are generated by different non-terrestrial network parts may be referred to herein as inter-NTN part mobility.

FIG. 10 shows two (1002, 1004) and one (1006) coverage regions corresponding to two and one spot beams generated by the first and second non-terrestrial network parts 308, 309, respectively. However, it will be appreciated that the present disclosure is not limited to such a number of spot beams (and corresponding coverage regions) per non-terrestrial network part. Certain categories of non-terrestrial network parts (for example, non-geostationary satellites) may be capable of generating many spot beams (for example, up to 16 or up to 64 spot beams) per non-terrestrial network part.

According to some embodiments of the present technique, in response to determining different steps are carried out according to whether the determined mobility corresponds to intra-NTN part mobility or to inter-NTN part mobility. In other words, a different mobility procedure is carried out, depending on whether or not a new spot beam (to be used after the mobility procedure) is transmitted by the same non-terrestrial network part as the spot beam that generates the coverage region in which the communications device is currently being served.

For example, with reference to FIG. 9, steps 804, 806 and 808 may be adapted to determine a motion of the communications device 208 relative to a current coverage region (which may be, for example, the second coverage region 1004) and determining a target coverage region (which may be, for example, either the first coverage region 1002 or the second coverage region 1006). Relative to the surface of the Earth, the relative motion of the non-terrestrial part 308 (and hence the relative motion of the current coverage region) may be significantly greater than the motion of the communications device 208, relative to the surface of the Earth.

According to some embodiments of the present technique, the mobility procedure may be a handover procedure (such as those illustrated in FIG. 7, FIG. 8 and FIG. 9 and described above) only in respect of inter-NTN part mobility. For example, the process illustrated in FIG. 9 may be modified so that it may be determined, subsequent to step 808 of the process illustrated in FIG. 9 and described above, that the current coverage region is the second coverage region 1004 which is generated by the first non-terrestrial network part 308, and the target coverage region is the third coverage region 1006 corresponding to the coverage region of the third spot beam, which is generated by the second non-terrestrial network part 309, different from the first non-terrestrial network part 308. In response to this determination, one or more of the remaining steps, starting at step 810, of FIG. 9 may be carried out in order to effect a handover, since the current coverage region and the target coverage region are generated by different non-terrestrial network parts.

According to some embodiments of the present technique, a beam management mobility procedure (which may be substantially in accordance with conventional techniques for beam management in a 5G/NR terrestrial wireless communications network) may be carried out in respect of intra-NTN part mobility. The beam management procedure may comprise beam level mobility, as described in [3]. Beam Level Mobility may not require explicit RRC signalling to be triggered and may be managed at protocol layers lower than an RRC layer, and an RRC may not be required to know which beam is being used at a given point in time.

For example, it may be determined, for example subsequent to step 808 of the process of FIG. 9, that the current coverage region is the second coverage region 1004 generated by a spot beam of the first non-terrestrial network part 308, and the target coverage region is the first coverage region 1002, corresponding to the coverage region of the first spot beam, which is also generated by the first non-terrestrial network part 308. In response to this determination, the communications device 208 may transition from being served by the first non-terrestrial network part 308 in the second coverage region 1004 to being served by the first non-terrestrial network part 308 in the first coverage region 1002, without the use of a handover procedure. In such embodiments, there may thus be avoided the need for signalling (such as RRC signalling which may be applicable in a conventional handover, or in a handover procedure as described elsewhere herein) between the communications device 208 and the first base station 101, thus reducing the complexity and time duration to execute the change and improving the efficiency of the mobility procedure in a large number of instances where a beam level mobility procedure is used.

In some embodiments, therefore, a plurality of coverage regions corresponding to respective spot beams generated by a single non-terrestrial network part may be considered as a single cell, for the purposes of handover evaluation and procedures. In some embodiments, all coverage regions corresponding to respective spot beams generated by a single non-terrestrial network part may be considered as a single cell, for the purposes of handover evaluation and procedures.

According to some embodiments, each spot beam (and hence its corresponding coverage region) generated by a non-terrestrial network part may be identified by means of one or more of a synchronization signal block (SSB) index and channel state information reference signal (CSI-RS).

In accordance with conventional beam management techniques for terrestrial 5G/NR communications networks, a maximum number of 8 or 4 beams may be identified within a single cell. However, in accordance with example embodiments of the present technique, a cell generated by a non-terrestrial network part may comprise a coverage region corresponding to the coverage of, for example up to 64 spot beams or up to 16 spot beams. Each beam or spot beam may be identified by means of an identifier carried by the SSB which is transmitted by that beam. Across all the beams, the SSBs form a burst. In some embodiments, the number of SSBs per burst may be accordingly greater than the number of SSBs per burst used in conventional terrestrial 5G/NR wireless networks such that up to, for example, 64 beams per cell or up to 16 beams per cell, may be uniquely identified.

In some embodiments of the present technique, transmissions within different coverage areas (e.g. corresponding to different spot beams) by a single non-terrestrial network part are synchronized (for example, the frame structures of the respective spot beams may be synchronised). Accordingly, the communications device 208 may synchronize quickly to transmissions in a new coverage area which is generated by the same non-terrestrial network part as a previous coverage area.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for an infrastructure equipment of a wireless telecommunications network, the wireless telecommunications network comprising a base station and a non-terrestrial network part, the non-terrestrial network part transmitting one or more beams to provide a wireless access interface for transmitting signals to and receiving signals representing data from a communications device within a coverage region of a cell or a spot beam, the method comprising: determining a location of the communications device, determining the coverage region of the cell or the spot beam, determining a relative motion, relative to the communications device, of the coverage region of the cell or the spot beam, and based on the location and the relative motion, initiating a cell change of the communications device.

Paragraph 2. A method according to Paragraph 1, wherein the coverage region of the cell varies over time in accordance with a motion of the non-terrestrial network part with respect to the surface of the Earth.

Paragraph 3. A method according to Paragraph 1 or Paragraph 2, the method comprising: determining a change in the coverage region of the cell or the spot beam based on a trajectory of the non-terrestrial network part, wherein the relative motion is determined based on the change in the coverage region of the cell or the spot beam.

Paragraph 4. A method according to any of Paragraphs 1 to 3, wherein a trajectory of the non-terrestrial network part is such that the coverage region of the cell or the spot beam is substantially constant over a time period.

Paragraph 5. A method according to any of Paragraphs 1 to 4, wherein the communications device is acting as a relay device for one or more terminal devices, each of the one or more terminal devices being in one of an RRC connected mode, an RRC idle state or an RRC inactive state.

Paragraph 6. A method according to any of Paragraphs 1 to 5, the method comprising transmitting to the communications device an indication that the communications device is to change a serving cell of the communications device when the communications device determines that one or more conditions are satisfied.

Paragraph 7. A method according to any of Paragraphs 1 to 6, wherein the infrastructure equipment is the non-terrestrial network part.

Paragraph 8. A method according to any of Paragraphs 1 to 7, wherein the infrastructure equipment is the base station.

Paragraph 9. A method according to any of Paragraphs 1 to 8, wherein the non-terrestrial network part comprises a satellite or an airborne vehicle.

Paragraph 10. A method according to any of Paragraphs 1 to 9, wherein the communications device is in an RRC connected mode, and initiating a cell change of the communications device comprises initiating a handover of the communications device.

Paragraph 11. A method for an infrastructure equipment of a wireless telecommunications network, the wireless telecommunications network comprising a base station and a non-terrestrial network part, the non-terrestrial network part transmitting one or more beams to provide a wireless access interface for transmitting signals to and receiving signals representing data from a communications device within a coverage region of a cell or a spot beam, the method comprising: determining that an uplink reference signal transmitted by the communications device in the cell or the spot beam has been received by the non-terrestrial network part, determining that the uplink reference signal was received in another cell or another spot beam, initiating a handover of the communications device to the other cell or the other spot beam.

Paragraph 12. A method for a communications device acting as a relay node for one or more terminal devices in a wireless telecommunications network, the wireless telecommunications network comprising a base station and a non-terrestrial network part, the method comprising: establishing a connection with the one or more terminal devices, establishing a connection in a cell or a spot beam with the base station via the non-terrestrial network part, determining a first location of the communications device at a first time, determining at least one of a second location of the communications device at a second time, and a speed and a direction of a motion of the communications device, transmitting an indication of the first location to the non-terrestrial network part, transmitting the at least one of the second location and the speed and the direction of the motion to the non-terrestrial network part, receiving an indication to perform a handover to another cell or another spot beam, and establishing a connection in the other cell or the other spot beam in response to receiving the indication while maintaining the connection with the one or more terminal devices.

Paragraph 13. A method according to Paragraph 12, wherein the one or more terminal devices are substantially stationary relative to the communications device.

Paragraph 14. A method according to Paragraph 12 or Paragraph 13, wherein a coverage region of the cell or the spot beam varies over time in accordance with a motion of the non-terrestrial network part with respect to the surface of the Earth.

Paragraph 15. A method according to any of Paragraphs 12 to 14, wherein a trajectory of the non-terrestrial network part is such that a coverage region of the cell or the spot beam is substantially constant over a time period.

Paragraph 16. A method according to any of Paragraphs 12 to 15, the method comprising receiving an indication that the communications device is to perform a handover to another cell or the other spot beam when the communications device determines that one or more conditions are satisfied.

Paragraph 17. A method according to any of Paragraphs 12 to 16, wherein the infrastructure equipment is the non-terrestrial network part.

Paragraph 18. A method according to any of Paragraphs 12 to 17, wherein the infrastructure equipment is the base station.

Paragraph 19. A method according to any of Paragraphs 12 to 18, wherein the non-terrestrial network part comprises a satellite or airborne vehicle.

Paragraph 20. An infrastructure equipment for use in a wireless telecommunications network, the wireless telecommunications network comprising a base station and a non-terrestrial network part, the non-terrestrial network part transmitting one or more beams to provide a wireless access interface for transmitting signals to and receiving signals representing data from a communications device within a coverage region of a cell, the infrastructure equipment operatively coupled to one or more of the base station and the non-terrestrial network part, the infrastructure equipment comprising processor circuitry and transceiver circuitry configured to operate together such that the infrastructure equipment is operable: to determine a location of the communications device, to determine the coverage region of the cell or the spot beam, to determine a relative motion, relative to the communications device, of the coverage region of the cell or the spot beam, and based on the location and the relative motion, to initiate a cell change of the communications device.

Paragraph 21. An infrastructure equipment according to Paragraph 20, wherein the infrastructure equipment is the non-terrestrial network part.

Paragraph 22. An infrastructure equipment according to Paragraph 20 or Paragraph 21, wherein the infrastructure equipment is the base station.

Paragraph 23. Circuitry for an infrastructure equipment for use in a wireless telecommunications network, the wireless telecommunications network comprising a base station and a non-terrestrial network part, the non-terrestrial network part transmitting one or more beams to provide a wireless access interface for transmitting signals to and receiving signals representing data from a communications device within a coverage region of a cell, the infrastructure equipment operatively coupled to one or more of the base station and the non-terrestrial network part, the infrastructure equipment comprising processor circuitry and transceiver circuitry configured to operate together such that the circuitry is operable: to determine a location of the communications device, to determine the coverage region of the cell or the spot beam, to determine a relative motion, relative to the communications device, of the coverage region of the cell or the spot beam, and based on the location and the relative motion, to initiate a cell change of the communications device.

Paragraph 24. A communications device for acting as a relay node for one or more terminal devices in a wireless telecommunications network, the wireless telecommunications network comprising a base station and a non-terrestrial network part, the communications device comprising controller circuitry and transceiver circuitry configured to operate together such that the communications device is operable: to establish a connection with the one or more terminal devices, to establish a connection in a cell or a spot beam with the base station via the non-terrestrial network part, to determine a first location of the communications device at a first time, to determine at least one of a second location of the communications device at a second time, and a speed and a direction of a motion of the communications device, to transmit an indication of the first location to the non-terrestrial network part, to transmit the at least one of the second location and the speed and the direction of the motion to the non-terrestrial network part, to receive an indication to perform a handover to another cell or another spot beam, and to establish a connection in the other cell or the other spot beam in response to receiving the indication while maintaining the connection with the one or more terminal devices.

Paragraph 25. Circuitry for a communications device for acting as a relay node for one or more terminal devices in a wireless telecommunications network, the wireless telecommunications network comprising a base station and a non-terrestrial network part, the communications device comprising controller circuitry and transceiver circuitry configured to operate together such that the circuitry is operable: to establish a connection with the one or more terminal devices, to establish a connection in a cell or a spot beam with the base station via the non-terrestrial network part, to determine a first location of the communications device at a first time, to determine at least one of a second location of the communications device at a second time, and a speed and a direction of a motion of the communications device, to transmit an indication of the first location to the non-terrestrial network part, to transmit the at least one of the second location and the speed and the direction of the motion to the non-terrestrial network part, to receive an indication to perform a handover to another cell or another spot beam, and to establish a connection in the other cell or the other spot beam in response to receiving the indication while maintaining the connection with the one or more terminal devices.

Paragraph 25. A method of operating a first non-terrestrial network part supporting a plurality of spot beams providing corresponding coverage areas in a wireless telecommunications network, the method comprising: communicating with a communications device in a first coverage area associated with a first spot beam of the first non-terrestrial network part: identifying a new coverage area for the communications device, the new coverage area corresponding to a coverage area of a second spot beam different from the first spot beam, and implementing a mobility procedure for the communications device; wherein, if the second spot beam is transmitted by the first non-terrestrial network part, the mobility procedure is a first mobility procedure and if the second spot beam is transmitted by a second non-terrestrial network part different from the first non-terrestrial network part the mobility procedure is a second mobility procedure different from the first mobility procedure.

Paragraph 26. A method according to paragraph 25, wherein the first mobility procedure is a beam level mobility procedure.

Paragraph 27. A method according to paragraph 25 or paragraph 26, wherein the second mobility procedure is a handover procedure.

Paragraph 28. A method according any of paragraphs 25 to 27, the method comprising: determining a location of the communications device, determining the coverage area of the first spot beam, and determining a relative motion, relative to the communications device, of the coverage area of the first spot beam, wherein the determining the new coverage area of the communications device is based on the location and the relative motion.

Paragraph 29. A method for a communications device acting as a relay node for one or more terminal devices in a wireless telecommunications network, the wireless telecommunications network comprising a base station and a non-terrestrial network part, the method comprising: establishing a connection with the one or more terminal devices, communicating with the base station in a first coverage area associated with a first spot beam of the non-terrestrial network part, and receiving an indication to perform a mobility procedure to a new coverage area, the new coverage area corresponding to a coverage area of a second spot beam different from the first spot beam wherein, if the second spot beam is transmitted by the first non-terrestrial network part, the mobility procedure is a first mobility procedure and if the second spot beam is transmitted by a second non-terrestrial network part different from the first non-terrestrial network part the mobility procedure is a second mobility procedure different from the first mobility procedure.

Paragraph 30. A method according to paragraph 29, wherein the first mobility procedure is a beam level mobility procedure.

Paragraph 31. A method according to paragraph 29 or paragraph 30, wherein the second mobility procedure is a handover procedure.

Paragraph 32. A method according to any of paragraphs 29 to 31, the method comprising: determining a first location of the communications device at a first time, determining at least one of a second location of the communications device at a second time, and a speed and a direction of a motion of the communications device, transmitting an indication of the first location to the non-terrestrial network part, transmitting the at least one of the second location and the speed and the direction of the motion to the non-terrestrial network part, and performing the mobility procedure in response to receiving the indication while maintaining the connection with the one or more terminal devices.

Paragraph 33. A first non-terrestrial network part supporting a plurality of spot beams providing corresponding coverage areas in a wireless telecommunications network, the first non-terrestrial network part comprising processor circuitry and transceiver circuitry configured to operate together such that the first non-terrestrial network part is operable: to communicate with a communications device in a first coverage area associated with a first spot beam of the first non-terrestrial network part: to identify a new coverage area for the communications device, the new coverage area corresponding to a coverage area of a second spot beam different from the first spot beam, and to implement a mobility procedure for the communications device; wherein, if the second spot beam is transmitted by the first non-terrestrial network part, the mobility procedure is a first mobility procedure and if the second spot beam is transmitted by a second non-terrestrial network part different from the first non-terrestrial network part the mobility procedure is a second mobility procedure different from the first mobility procedure.

Paragraph 34. Circuitry for a first non-terrestrial network part supporting a plurality of spot beams providing corresponding coverage areas in a wireless telecommunications network, the first non-terrestrial network part comprising processor circuitry and transceiver circuitry configured to operate together such that the circuitry is operable: to communicate with a communications device in a first coverage area associated with a first spot beam of the first non-terrestrial network part: to identify a new coverage area for the communications device, the new coverage area corresponding to a coverage area of a second spot beam different from the first spot beam, and to implement a mobility procedure for the communications device; wherein, if the second spot beam is transmitted by the first non-terrestrial network part, the mobility procedure is a first mobility procedure and if the second spot beam is transmitted by a second non-terrestrial network part different from the first non-terrestrial network part the mobility procedure is a second mobility procedure different from the first mobility procedure.

Paragraph 35. A communications device for acting as a relay node for one or more terminal devices in a wireless telecommunications network, the wireless telecommunications network comprising a base station and a non-terrestrial network part, the communications device comprising controller circuitry and transceiver circuitry configured to operate together such that the communications device is operable: to establish a connection with the one or more terminal devices, to communicate with the base station in a first coverage area associated with a first spot beam of the non-terrestrial network part, and to receive an indication to perform a mobility procedure to a new coverage area, the new coverage area corresponding to a coverage area of a second spot beam different from the first spot beam; wherein, if the second spot beam is transmitted by the first non-terrestrial network part, the mobility procedure is a first mobility procedure and if the second spot beam is transmitted by a second non-terrestrial network part different from the first non-terrestrial network part the mobility procedure is a second mobility procedure different from the first mobility procedure.

Paragraph 36. Circuitry for a communications device for acting as a relay node for one or more terminal devices in a wireless telecommunications network, the wireless telecommunications network comprising a base station and a non-terrestrial network part, the communications device comprising controller circuitry and transceiver circuitry configured to operate together such that the circuitry is operable: to establish a connection with the one or more terminal devices, to establish a connection in a spot beam with the base station via the non-terrestrial network part, to receive an indication to perform a mobility procedure to a second spot beam wherein, if the second spot beam is transmitted by the non-terrestrial network part, the mobility procedure is a beam level mobility procedure.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TR 38.811 "Study on New Radio (NR) to support non terrestrial networks (Release 15)", December 2017

[2] Holma H. and Toskala A, "LTE for UMTS OFDMA and SC-FDMA based radio access", John Wiley and Sons, 2009

[3] 3GPP TS 38.300, "NR; NR and NG-RAN Overall Description; Stage 2 (Release 15)", v.15.0.0, December 2017

What is claimed is:

1. A method of operating a first non-terrestrial network part supporting a plurality of spot beams providing corresponding coverage areas in a wireless telecommunications network, the method comprising:
communicating with a communications device in a first coverage area associated with a first spot beam of the first non-terrestrial network part;
determining a location of the communications device;
determining the coverage area of the first spot beam;
determining a relative motion, relative to the communications device, of the coverage area of the first spot beam;
determining, at the first non-terrestrial network part, a change in the coverage area of the first spot beam based on a trajectory of the non-terrestrial network part, wherein determining the relative motion is based on the change in the coverage area of the first spot beam;
identifying a new coverage area for the communications device based on the location and the relative motion, the new coverage area corresponding to a coverage area of a second spot beam different from the first spot beam; and
implementing a mobility procedure for the communications device.

2. A method for a communications device acting as a relay node for one or more terminal devices in a wireless telecommunications network, the wireless telecommunications network comprising a base station and a non-terrestrial network part, the method comprising:
establishing a connection with the one or more terminal devices,
communicating with the base station in a first coverage area associated with a first spot beam of the non-terrestrial network part, and
receiving an indication to perform a mobility procedure to a new coverage area, the new coverage area corresponding to a coverage area of a second spot beam different from the first spot beam,
wherein, in response to the second spot beam being supported by the first non-terrestrial network part, the mobility procedure is a first mobility procedure, and in response to the second spot beam being supported by a second non-terrestrial network part different from the first non-terrestrial network part the mobility procedure is a second mobility procedure different from the first mobility procedure,
wherein the first mobility procedure is a beam level mobility procedure managed at protocol layers lower than an RRC layer without the use of a handover procedure and RRC signaling, and the second mobility procedure is a handover procedure based on an RRC connection between the communications device and the second non-terrestrial network part.

3. The method according to claim 2, the method comprising:
determining a first location of the communications device at a first time,
determining at least one of a second location of the communications device at a second time, and a speed and a direction of a motion of the communications device,
transmitting an indication of the first location to the non-terrestrial network part,
transmitting the at least one of the second location and the speed and the direction of the motion to the non-terrestrial network part, and
performing the mobility procedure in response to receiving the indication while maintaining the connection with the one or more terminal devices.

4. Circuitry for a first non-terrestrial network part supporting a plurality of spot beams providing corresponding coverage areas in a wireless telecommunications network, the first non-terrestrial network part comprising processor circuitry and transceiver circuitry configured to operate together such that the circuitry is operable:
to communicate with a communications device in a first coverage area associated with a first spot beam of the first non-terrestrial network part:
to identify a new coverage area for the communications device, the new coverage area corresponding to a coverage area of a second spot beam different from the first spot beam, and
to implement a mobility procedure for the communications device;
wherein, in response to the second spot beam being supported by the first non-terrestrial network part, the mobility procedure is a first mobility procedure, and in response to the second spot beam being supported by a second non-terrestrial network part different from the first non-terrestrial network part the mobility procedure is a second mobility procedure different from the first mobility procedure,
wherein the first mobility procedure is a beam level mobility procedure managed at protocol layers lower than an RRC layer without the use of a handover procedure and RRC signaling and the second mobility procedure is a handover procedure based on an RRC connection between the communications device and the second non-terrestrial network part.

5. A communications device for acting as a relay node for one or more terminal devices in a wireless telecommunications network, the wireless telecommunications network comprising a base station and a non-terrestrial network part, the communications device comprising controller circuitry and transceiver circuitry configured to operate together such that the communications device is operable:
to establish a connection with the one or more terminal devices,
to communicate with the base station in a first coverage area associated with a first spot beam of the non-terrestrial network part, and
to receive an indication to perform a mobility procedure to a new coverage area, the new coverage area corresponding to a coverage area of a second spot beam different from the first spot beam,
wherein, in response to the second spot beam being supported by the first non-terrestrial network part, the mobility procedure is a first mobility procedure, and in response to the second spot beam being supported by a second non-terrestrial network part different from the first non-terrestrial network part the mobility procedure is a second mobility procedure different from the first mobility procedure,
wherein the first mobility procedure is a beam level mobility procedure managed at protocol layers lower than an RRC layer without the use of a handover procedure and RRC signaling and the second mobility procedure is a handover procedure based on an RRC connection between the communications device and the second non-terrestrial network part.

\* \* \* \* \*